United States Patent
Khayrallah et al.

(10) Patent No.: US 7,796,956 B2
(45) Date of Patent: Sep. 14, 2010

(54) RECEIVER FOR A MULTI-ANTENNA, MULTI-BAND RADIO

(75) Inventors: Ali S. Khayrallah, Cary, NC (US); William J. Croughwell, Durham, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 833 days.

(21) Appl. No.: 11/120,939

(22) Filed: May 3, 2005

(65) Prior Publication Data

US 2006/0252380 A1    Nov. 9, 2006

(51) Int. Cl.
*H04B 1/40* (2006.01)

(52) U.S. Cl. .............. 455/75; 455/552.1; 455/130; 455/134; 455/73; 455/135; 455/164.1; 455/173.1; 455/192.1

(58) Field of Classification Search ............ 455/75, 455/552.1, 550.1, 130, 135, 134, 73, 164.1, 455/173.1, 192.1
See application file for complete search history.

(56) References Cited

U.S. PATENT DOCUMENTS

| | | | | |
|---|---|---|---|---|
| 5,481,572 A | * | 1/1996 | Skold et al. | 375/347 |
| 5,680,419 A | * | 10/1997 | Bottomley | 375/347 |
| 5,794,159 A | * | 8/1998 | Portin | 455/553.1 |
| 5,796,788 A | * | 8/1998 | Bottomley | 375/341 |
| 5,878,093 A | * | 3/1999 | Molnar et al. | 375/347 |
| 6,006,080 A | * | 12/1999 | Kato et al. | 455/323 |
| 6,029,054 A | * | 2/2000 | Lemley | 455/257 |
| 6,081,566 A | * | 6/2000 | Molnar et al. | 375/347 |
| 6,128,355 A | * | 10/2000 | Backman et al. | 375/347 |
| 6,173,014 B1 | * | 1/2001 | Forssen et al. | 375/267 |
| 6,292,474 B1 | * | 9/2001 | Ali et al. | 370/328 |
| 2002/0110189 A1 | * | 8/2002 | Souissi et al. | 375/235 |
| 2003/0095530 A1 | * | 5/2003 | Lin | 370/342 |
| 2003/0227961 A1 | * | 12/2003 | Batra et al. | 375/147 |
| 2004/0008614 A1 | * | 1/2004 | Matsuoka et al. | 370/203 |
| 2004/0198420 A1 | * | 10/2004 | He et al. | 455/552.1 |
| 2005/0245207 A1 | * | 11/2005 | Suzuki et al. | 455/101 |
| 2005/0266904 A1 | | 12/2005 | Kitaji et al. | |
| 2006/0067445 A1 | * | 3/2006 | Sadahiro | 375/347 |
| 2006/0125689 A1 | * | 6/2006 | Narayan et al. | 342/381 |
| 2006/0153319 A1 | * | 7/2006 | Gorsuch et al. | 375/347 |

FOREIGN PATENT DOCUMENTS

DE    1 473 844 A1 *   3/2004

* cited by examiner

*Primary Examiner*—Duc Nguyen
*Assistant Examiner*—Amar Daglawi

(57) ABSTRACT

A front-end architecture and processing method for a receiver in a multi-antenna, multi-band radio. Band-dependent components for multiple frequency bands are not duplicated in each receive chain. In one embodiment, a first receive chain includes band-dependent components for the first frequency band only. A second receive chain includes band-dependent components for the second frequency band only. The receive chains may be dedicated to particular antennas, or a switch may be utilized to route signals from different antennas to the different band-dependent components. Each receive chain may include band-independent components, or a single set of band-independent components may be utilized for the different receive chains by multiplexing the output of the band-dependent component sections.

13 Claims, 4 Drawing Sheets

RECEIVER FOR A MULTI-ANTENNA, MULTI-BAND RADIO

BACKGROUND

The present invention relates to radio communication systems. More particularly, and not by way of limitation, the present invention is directed to a front-end architecture and processing method for a receiver in a multi-antenna, multi-band radio.

Cellular telecommunication systems are deployed on multiple frequency bands such as 850 MHz, 900 MHz, 1500 MHz, 1800 MHz, and 1900 MHz. More bands, such as 450 MHz and 700 MHz are likely to become available in parts or all of the world. Radio receivers, such as those utilized in mobile terminals, may operate on more than one band. For each band, there is a receive chain comprising a number of components such as the antenna, low noise amplifier, correlators, combiners, estimators, and the like. Mobile terminals that operate in all or most of these bands must duplicate parts of their receive chain and tune each duplicated part to a specific band.

Some of the receiver components are optimized for a particular band, such as the cellular band at 850 MHz or 900 MHz. Although these are fairly wide bands, a single receive chain can generally be utilized to cover an entire band with good performance. In addition, the same receive chain can be utilized to cover an adjacent or nearly adjacent band with reasonably good performance. For example, a single receive chain designed for the 850 MHz band may work reasonably well for parts or all of the 900 MHz band. While the resulting performance from that receiver would probably not be considered adequate in the 900 MHz band when viewed in isolation, the receiver would still be a useful component of a multi-antenna receiver that processes different signals jointly.

Some bands, however, are widely separated. For example, in the US, operators utilize the 1900 MHz band and the 850 MHz band, while in Europe the 1800 MHz band and the 900 MHz band are utilized. When there are significant differences between the bands, the band-dependent components in a receive chain do not work well in both bands. Certain GSM phones actually have two separate receivers, one for the low band and one for the high band. Depending on the make and model of the phone, the antennas may also be different for each band.

Duplication of receive chains creates problems for the designers of mobile terminals. The duplicated components add to the size, cost, weight, and battery consumption of the terminal. As market requirements continue to push for smaller terminals with additional features, it becomes increasingly important to make efficient use of all of the space within the terminal. The present invention provides a receiver that makes more efficient use of space within the terminal while maintaining good performance over multiple frequency bands.

SUMMARY

In one aspect, the present invention is directed to a front-end architecture for a receiver in a multi-antenna, multi-band radio in which a radio signal is received through a first antenna and a second antenna, and the received signal is processed through corresponding first and second receive chains. Each receive chain includes band-independent components that are independent of the frequency band of the received signal and band-dependent components that are optimized for processing signals in specific frequency bands.

The invention improves on prior art designs that duplicate the band-dependent components for multiple frequency bands in each dedicated receive chain. The improved architecture includes a first dedicated receive chain implemented prior to a baseband processor, for processing signals received by the first antenna, and a second dedicated receive chain for processing signals received by the second antenna. The first dedicated receive chain includes band-dependent components for the first frequency band only, and band-independent components. The second dedicated receive chain includes band-dependent components for the second frequency band only, and band-independent components. Thus, band-dependent components for multiple frequency bands are not duplicated in each dedicated receive chain.

In another aspect, the improved architecture includes a set of band-independent components for the first receive chain; a set of band-independent components for the second receive chain; and a band-dependent component section. The band-dependent component section includes a single set of band-dependent components for the first frequency band; a single set of band-dependent components for the second frequency band; and a switch connected to the first and second antennas that selectively routes signals from each antenna to either the band-dependent components for the first frequency band or the band-dependent components for the second frequency band. Thus, once again, the band-dependent components for multiple frequency bands are not duplicated in each receive chain.

In yet another aspect, the improved architecture includes a single set of band-independent components that are shared between the first and second receive chains; and a band-dependent component section. The band-dependent component section includes a single set of band-dependent components for the first frequency band; a single set of band-dependent components for the second frequency band; and a switch connected to the first and second antennas that selectively routes signals from each antenna to either the band-dependent components for the first frequency band or the band-dependent components for the second frequency band. The architecture also includes a multiplexer connected to the set of band-independent components and to the band-dependent components for the first frequency band and the band-dependent components for the second frequency band. The multiplexer samples the two signals output from the band-dependent components and multiplexes the output signals into a single analog signal, which is fed into the band-independent components. Thus, in this embodiment, the band-independent components and band-dependent components for multiple frequency bands are not duplicated in each receive chain.

In still yet another aspect, the improved architecture includes a single set of band-independent components that are shared between the first and second receive chains; a first set of band-dependent components that includes a portion of the band-dependent components for a first frequency band, and a portion of the band-dependent components for a second frequency band; and a second set of band-dependent components that includes the remainder of the band-dependent components for the first frequency band, and the remainder of the band-dependent components for the second frequency band. The architecture also includes a switch connected to the first and second antennas that selectively routes signals from each antenna to either the first set of band-dependent components or the second set of band-dependent components; and a multiplexer connected to the set of band-independent components and to the first and second sets of band-dependent components. The multiplexer samples the two signals output from the band-dependent components and multiplexes the output signals into a single analog signal, which is fed into the band-independent components. Again in this embodiment, the band-independent components and band-dependent components for multiple frequency bands are not duplicated in each receive chain.

In still yet another aspect, the present invention is directed to a method of front-end processing a received radio signal, wherein the signal is received through a first antenna and a second antenna, and is processed through corresponding first and second receive chains. In an improvement over prior art processing methods, the present invention includes the steps of processing signals received by the first antenna in a first dedicated receive chain having band-dependent components for a first frequency band only; processing signals received by the second antenna in a second dedicated receive chain having band-dependent components for a second frequency band only; processing signals output by the first and second dedicated receive chains in a set of band-independent components; and jointly processing the signals output from the band-independent components.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention avoids the duplication of certain band-dependent components in a multi-antenna receiver where one or more receive chains are treated as secondary. The invention exploits the fact that while the performance of band-dependent components degrades if they are used outside their intended band, many still function reasonably well, particularly in an adjacent or nearly adjacent band. Although the performance of individual out-of-band signals is degraded, when the signal is processed jointly with signals from other primary or secondary receive chains, the overall performance is quite good.

Figure 1:
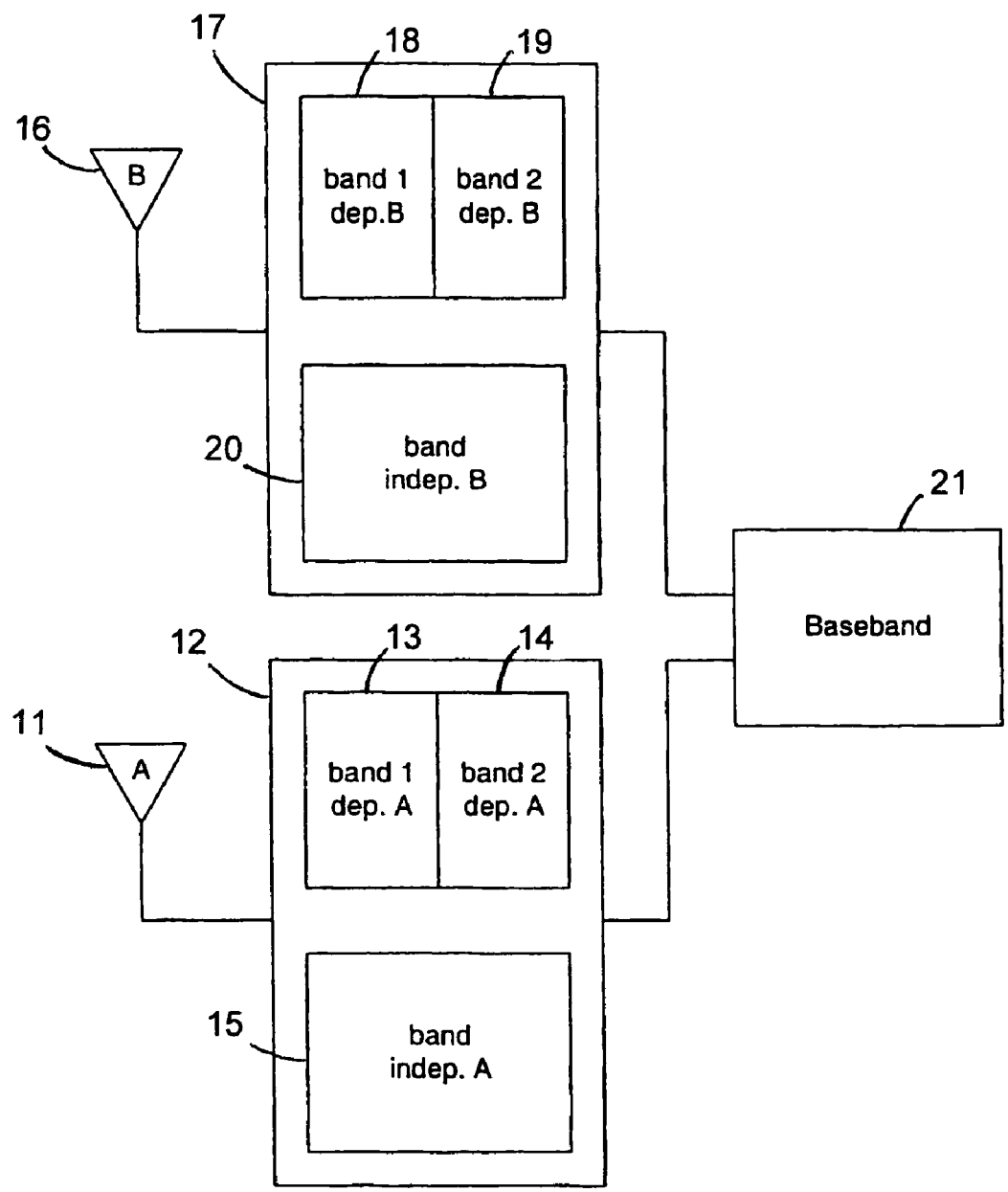
FIG. 1 (Prior Art) is a simplified block diagram of a conventional architecture of a front end portion of a receiver in a multi-antenna, multi-band radio.

FIG. 1 is a simplified block diagram of a front end portion of a conventional receiver in a multi-antenna, multi-band radio. Antenna-A 11 connects to front end-A 12, which includes band-1 dependent components 13, band-2 dependent components 14, and band independent components 15. Antenna-B 16 connects to front end-B 17, which includes band-1 dependent components 18, band-2 dependent components 19, and band independent components 20. Thus, each of the front ends (A and B) includes all of the receive-chain components. The band-dependent components may include filters, amplifiers, duplexers, and the like. In addition, each antenna may be band-dependent and may consist of a plurality of antenna elements. For simplicity, a single antenna element has been shown for each antenna.

The two receive chains (A and B) feed into a single baseband processor 21 where the signals are jointly processed. Many types of processing exploit multiple antenna signals, such as maximum ratio combining (MRC), also referred to as diversity combining, interference rejection combining (IRC), joint demodulation, and so on. These techniques offer different compromises of complexity and performance.

The invention is based on the knowledge that some types of signal processing, such as IRC processing, are effective even with "bad" antenna configurations and out-of-band component use. IRC processing emphasizes the suppression of own cell and other cell interference. In Time Division Multiple Access (TDMA) and Code Division Multiple Access (CDMA) cellular telecommunication systems, IRC processing remains effective even with bad antenna configurations. A bad antenna configuration may occur when two antennas are placed in a small mobile terminal. With limited space, it is difficult to physically separate the antennas. Additionally, while the first antenna may occupy an optimal (i.e., "good") position, the second antenna may be placed in a less desirable (i.e., "bad") position.

The effect of the antenna configuration on the received signal may be summarized with two parameters. The first parameter is the correlation, which reflects the similarity of the two received signals at the receiver due to the proximity of the two antennas. While it is possible to reduce this correlation with advanced antenna designs, in practice the way a phone is used would often preclude the benefits of such designs. For example, if the phone is placed in a pocket or bag, laid on a table, or held in a user's hand, the signal correlation may be increased. The second parameter is the mismatch in gain with respect to the noise floor due to the good location of the first antenna and the bad location of the second antenna. IRC processing, however, has proven to be fairly insensitive to a wide range of signal correlation and mismatch, thus providing good gains even with bad antenna configurations.

Regarding the band-dependent components, if bands 1 and 2 are adjacent or nearly adjacent, the band-dependent components for one band still perform reasonably well when receiving a signal having its carrier frequency in the other band. For example, a power amplifier may not be as efficient, or its linearity may be slightly compromised, or its gain may not be as flat over the frequency band if the amplifier is operating out-of-band. Nevertheless, if the bands are adjacent or nearly so, the amplifier performs reasonably well.

Dedicated Architecture

Figure 2:
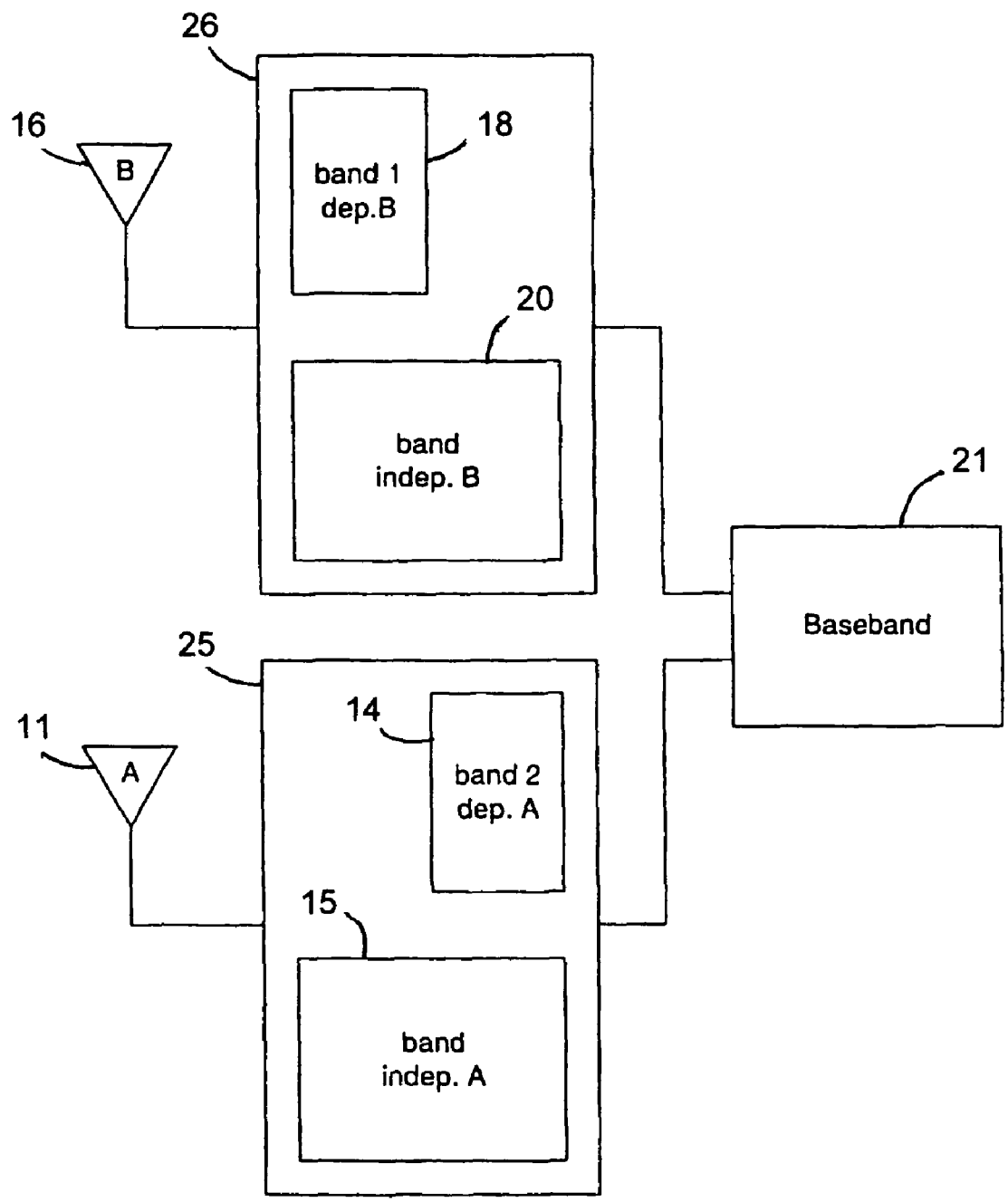
FIG. 2 is a simplified block diagram of a first embodiment of a front end portion of the receiver of the present invention.

FIG. 2 is a simplified block diagram of a first embodiment of a front end portion of the receiver of the present invention. In this receiver embodiment, both antennas A and B are placed in reasonable locations so that the gain mismatch is minimized. The correlation is still presumed to be high due to the small size of the mobile terminal and resulting proximity of the antennas. With reference to FIGS. 1 and 2, it is supposed that the signal of interest is in band-2. In modified receive chain A 25, the band-2 dependent components 14 are activated. In a conventional receiver, the band-1 dependent components 13 in receive chain A would also be activated. In the present invention, however, the band-1 dependent components 18 in modified receive chain B 26 are activated instead. In this way, the receiver can use the simplified architecture illustrated in FIG. 2. In this architecture, the unused band-dependent components are not duplicated, and the receiver has a dedicated receive chain for each band.

Note that the performance of the primary receive chain A 25 should be good since the in-band, band-2 dependent components 14 are utilized to process the signal of interest, which is in band-2. Conversely, the performance of the secondary receive chain B 26 should be bad since the out-of-band, band-1 dependent components 18 are utilized to process the signal. In this sense, receive chain A is the primary or good chain, and receive chain B is the secondary or bad chain. Analysis and testing has shown, however, that by jointly processing the good signal from primary receive chain A and the bad signal from secondary receive chain B, the overall performance is very good.

It would also be understood by one skilled in the art that some band-dependent components may not be usable out-of-band. Those components, therefore, must still be duplicated in each receive chain. Note that if the signal of interest is in band-1 rather than band-2, then receive chain B becomes the primary or good chain while receive chain A becomes the secondary or bad receive chain. In this sense, the dedicated architecture adapts automatically to band changes.

Switched Architecture

Figure 3:
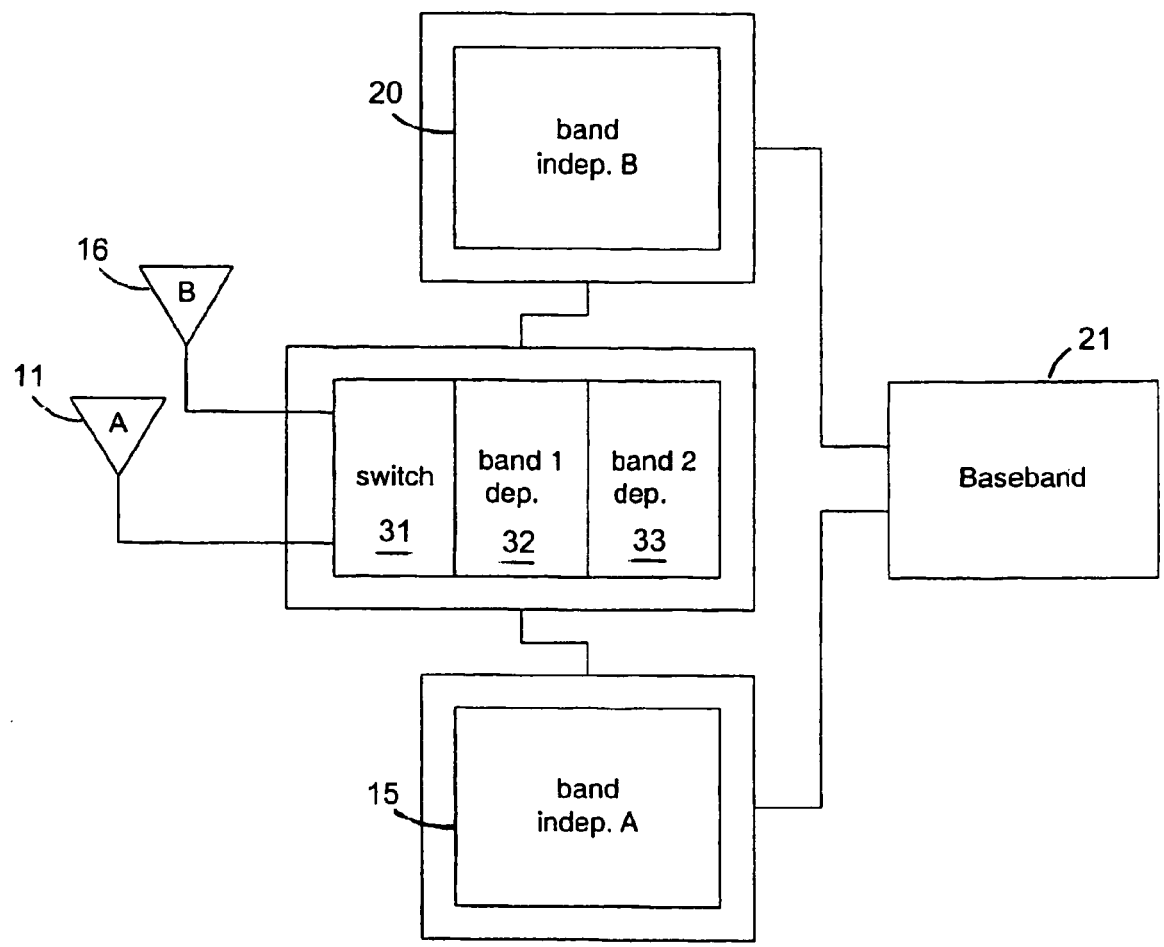
FIG. 3 is a simplified block diagram of a second embodiment of the front end portion of the receiver of the present invention.

FIG. 3 is a simplified block diagram of a second embodiment of the front end portion of the receiver of the present invention. This switched architecture embodiment has the capability to adapt to time-varying conditions regarding the good and bad antennas and the band of the signal of interest. In this embodiment, the band-dependent components remain unduplicated, thereby achieving the savings in space, weight, and cost of the first embodiment. In addition, a switching function 31 is added so that the band-1 dependent components 32 and the band-2 dependent components 33 can be selectively connected to either receive chain. For example, consider again the situation in which antenna-A 11 is in the good location, antenna-B 16 is in the bad location, and the signal of interest is in band-2. Through the switching function, the band-2 dependent components 33 can be connected into receive chain A, while the band-1 dependent components 32 are connected into receive chain B. This achieves the goal of connecting the in-band, band-2 dependent components into the receive chain with the good antenna location. Likewise, the out-of-band, band-1 dependent components are connected into the receive chain with the bad antenna location. By jointly processing the good signal from receive chain A and the bad signal from receive chain B, the overall performance is very good.

If one of the receiving conditions changes, for example, if the signal of interest changes to band-1, the switching function 31 switches the band-1 dependent components 32 into receive chain A, and switches the band-2 dependent components 33 into receive chain B. This again achieves the goal of connecting the in-band dependent components (in this case, band-1 dependent components) into the receive chain with the good antenna location. Likewise, the out-of-band, band-2 dependent components are connected into the receive chain with the bad antenna location. Again, by jointly processing the good signal from receive chain A and the bad signal from receive chain B, the overall performance is very good.

Sampling and Multiplexing Architecture

Figure 4:
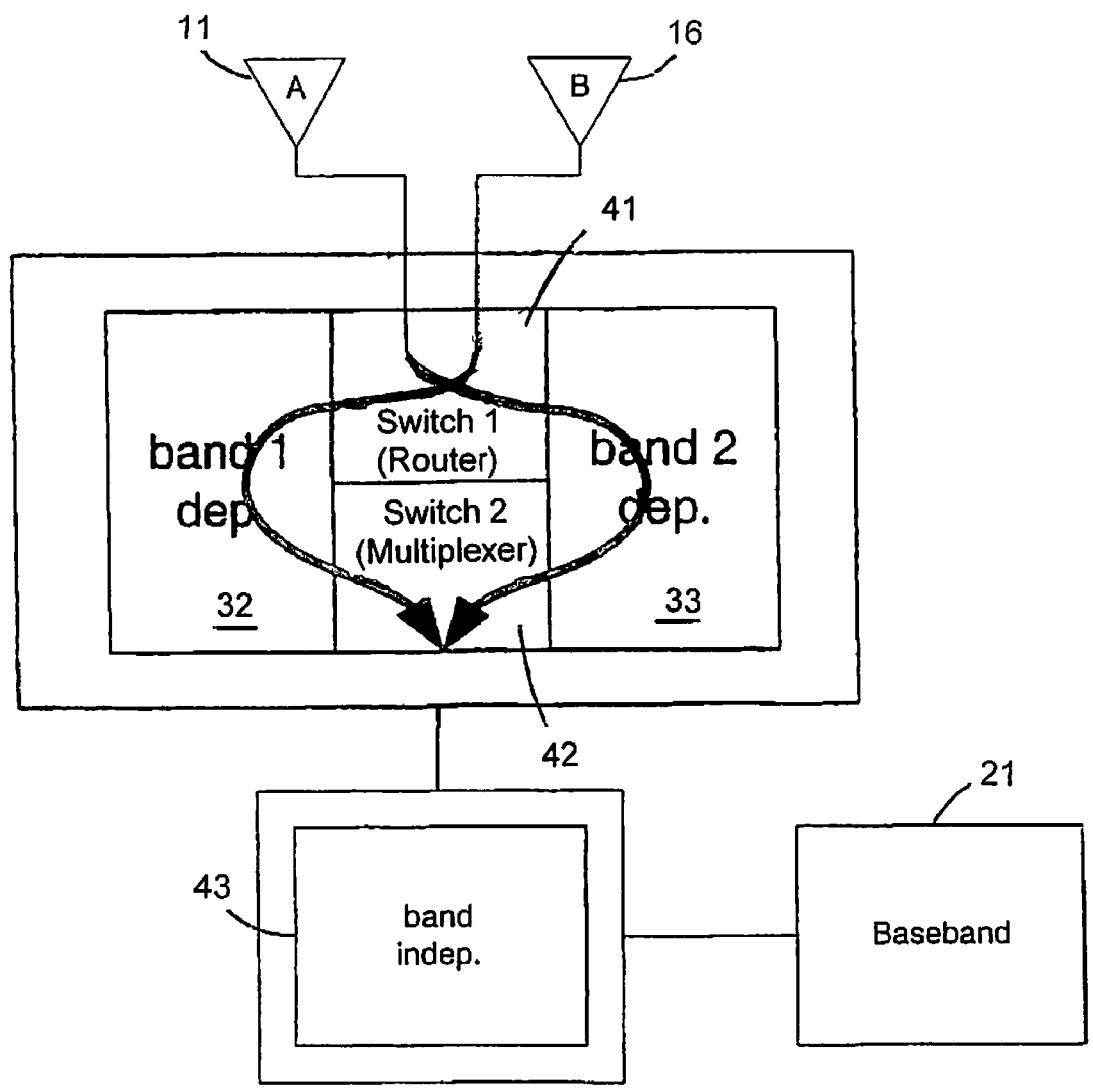
FIG. 4 is a simplified block diagram of a third embodiment of the front end portion of the receiver of the present invention.

FIG. 4 is a simplified block diagram of a third embodiment of the front end portion of the receiver of the present invention. This embodiment achieves further savings in components by sampling the two received signals and multiplexing them into a single signal. Consider again the situation in which antenna-A 11 is in the good location, antenna-B 16 is in the bad location, and the signal of interest is in band-2. Switch-1 41 then connects the in-band, band-2 dependent components 33 into receive chain A, while the out-of-band, band-1 dependent components 32 are connected into receive chain B. Switch-2 42 samples and multiplexes the two signals into a single analog signal, which is fed into a single band-independent component section 43. Switch-2 feeds the band-independent component section by alternating the output of the band-1 dependent components and the band-2 dependent components at the sample interval. The band-independent component section generates samples after it has stabilized following the switch from one band to the other. The band-independent processing and the processing in the baseband processor 21 are unchanged except that the samples are de-interleaved in the baseband processor before further processing. This architecture results in the elimination of the duplicated band-independent component section that was present in the first and second embodiments.

Additional Embodiments

The embodiments above may be extended to architectures that include more than two receive chains. Multiple antennas may be ranked from best to worst, and the best antennas are connected to the in-band, band-dependent components. Likewise, the worst antennas are connected to the out-of-band, band-dependent components. Thereafter, the good signals and the bad signals are jointly processed to provide a very good result.

The embodiments above may also be extended to architectures that process signals in more than two bands, as long as the additional bands are adjacent or nearly adjacent to the band containing the signal of interest. Again, the best antennas are connected to the in-band, band-dependent components, and the worst antennas are connected to the out-of-band, band-dependent components. Thereafter, the good signals and the bad signals are jointly processed to provide a very good result.

In yet another embodiment, rather than creating a good signal and a bad signal by connecting the good antenna to the in-band components, and the bad antenna to the out-of-band components, the out-of-band components are spread between the two signals, thus producing two signals of medium quality. While IRC processing works quite well for jointly processing a good signal and a bad signal, other types of processing, such as MRC or joint demodulation, may provide better results when two signals of medium quality are jointly processed.

In yet another embodiment, the bad signal may be so compromised that it becomes unusable. For example, the signal may be too weak with respect to the noise floor. In this case, processing with IRC, MRC, or most other techniques will result in the bad signal being ignored. In such a case, it is advantageous to attempt to improve the quality of the bad signal enough to make it usable. In this embodiment, this is achieved at the expense of the good signal by providing a few of the in-band components to the bad receive chain.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A front-end architecture for a receiver in a multi-antenna, multi-band radio in which a radio signal is received through a first antenna and a second antenna, and the received signal is processed through corresponding first and second receive chains, each receive chain including band-independent components that process signals equally well in different frequency bands and band-dependent components that are optimized for processing signals in specific frequency bands, wherein an improvement comprises:

a first dedicated receive chain implemented prior to a baseband processor, for processing signals received by the first antenna, comprising:
band-dependent components for the first frequency band only; and
band-independent components; and
a second dedicated receive chain implemented prior to the baseband processor, for processing signals received by the second antenna, comprising:
band-dependent components for the second frequency band only; and
band-independent components;
means for applying a radio signal in the first frequency band to both the first and second dedicated receive chains; and
a baseband processor for receiving processed outputs from the first and second dedicated receive chains and jointly processing the outputs wherein the radio signal is in the first frequency band and the signal from the first antenna is provided to in-band band-dependent components in the first dedicated receive chain, and the signal from the second antenna is provided to out-of-band band-dependent components in the second dedicated receive chain, thereby producing a first signal of good quality and a second signal of poor quality, wherein the baseband processor includes means for jointly processing the good quality signal and the poor quality signal utilizing interference rejection combining (IRC)-type processing to produce a very good quality signal.

2. A front-end architecture for a receiver in a multi-antenna, multi-band radio in which a radio signal is received through a first antenna that provides a strong signal from the radio signal and a second antenna that provides a weak signal from the radio signal, and the received signal is processed through corresponding first and second receive chains, each receive chain including band-independent components that process signals equally well in different frequency bands and band-dependent components that are optimized for processing signals in specific frequency bands, wherein an improvement comprises:
a set of band-independent components for the first receive chain;
a set of band-independent components for the second receive chain; and
a band-dependent component section, comprising:
a single set of band-dependent components for a first frequency band;
a single set of band-dependent components for a second frequency band; and
a switch connected to the first and second antennas that selectively routes signals from each antenna to the band-dependent components for the first frequency band and the band-dependent components for the second frequency band;
wherein when a signal of interest is in the first frequency band, the switch includes:
means for routing the strong signal from the first antenna to the in-band band-dependent components for the first frequency band and to the set of band-independent components for the first receive chain, thereby producing a first output signal of good quality; and
means for routing the weak signal from the second antenna to the out-of-band band-dependent components for the second frequency band and to the set of band-independent components for the second receive chain, thereby producing a second output signal of poor quality; and a baseband processor for receiving and jointly processing the output signal of good quality and the output signal of poor quality.

3. The front-end architecture for a receiver of claim 2, wherein the baseband processor includes means for jointly processing the good quality signal and the poor quality signal utilizing interference rejection combining (IRC)-type processing to produce a very good quality signal.

4. A front-end architecture for a receiver in a multi-antenna, multi-band radio in which a radio signal is received through a first antenna that provides a strong signal from the radio signal and a second antenna that provides a weak signal from the radio signal, and the received signal is processed through corresponding first and second receive chains, each receive chain including band-independent components that process signals equally well in different frequency bands and band-dependent components that are optimized for processing signals in specific frequency bands, wherein an improvement comprises:
a single set of band-independent components that are shared between the first and second receive chains; and
a band-dependent component section, comprising:
a single set of band-dependent components for a first frequency band;
a single set of band-dependent components for a second frequency band;
a switch connected to the first and second antennas that selectively routes signals from each antenna to the band-dependent components for the first frequency band and the band-dependent components for the second frequency band, wherein when a signal of interest is in the first frequency band, the switch includes:
means for routing the strong signal from the first antenna to the in-band band-dependent components for the first frequency band, thereby producing a first output signal of good quality; and
means for routing the weak signal from the second antenna to the out-of-band band-dependent components for the second frequency band, thereby producing a second output signal of poor quality; and
a multiplexer connected to the shared set of band-independent components, and to the band-dependent components for the first frequency band and the band-dependent components for the second frequency band, said multiplexer sampling the good quality signal and the poor quality signal and multiplexing the good quality signal and the poor quality signal into a single analog signal, which is fed into the shared set of band-independent components.

5. The front-end architecture for a receiver of claim 4, wherein the multiplexer feeds the analog signal to the band-independent components by alternating the output of the band-dependent components for the first frequency band and the band-dependent components for the second frequency band at an interval used for sampling the output signals.

6. The front-end architecture for a receiver of claim 5, wherein the band-independent components generate samples after the band-independent components have stabilized following the switching from one band to the other.

7. The front-end architecture for a receiver of claim 6, further comprising a de-interleaving unit that de-interleaves the samples generated by the band-independent components prior to further processing by a baseband processor.

8. The front-end architecture for a receiver of claim 4, further comprising a baseband processor for jointly processing the good quality signal and the poor quality signal utilizing interference rejection combining (IRC)-type processing to produce a very good quality signal.

9. A front-end architecture for a receiver in a multi-antenna, multi-band radio in which a radio signal is received through a first antenna that provides a strong signal from the radio signal and a second antenna that provides a weak signal from the radio signal, and the received signal is processed through corresponding first and second receive chains, each receive chain including band-independent components that process signals equally well in different frequency bands and band-dependent components that are optimized for processing signals in specific frequency bands, wherein an improvement comprises:
 a single set of band-independent components that are shared between the first and second receive chains;
 a first set of band-dependent components that includes a portion of the band-dependent components for a first frequency band, and a portion of the band-dependent components for a second frequency band;
 a second set of band-dependent components that includes the remainder of the band-dependent components for the first frequency band, and the remainder of the band-dependent components for the second frequency band;
 a switch connected to the first and second antennas that routes signals from each antenna to both the first set of band-dependent components and the second set of band-dependent components, thereby producing first and second output signals of medium quality; and
 a multiplexer connected to the set of band-independent components, and to the first and second sets of band-dependent components, said multiplexer sampling the two medium quality signals output from the band-dependent components and multiplexing the medium quality signals into a single analog signal, which is fed into the band-independent components.

10. The front-end architecture for a receiver of claim 9, further comprising a baseband processor for jointly processing the two medium quality signals utilizing maximum ratio combining (MRC) or joint demodulation to produce a very good quality signal.

11. The front-end architecture for a receiver of claim 9, wherein the radio signal is in the first frequency band, and the first antenna provides a relatively strong signal from the radio signal, and the second antenna provides a weak signal from the radio signal that is so weak it is unusable when processed by the number of band-dependent components for the first frequency band initially included in either the first or second sets of band-dependent components, wherein the architecture includes means for reallocating a portion of the band-dependent components for the first frequency band from the relatively strong signal to the weak signal, thereby slightly degrading the quality of the relatively strong signal while improving the quality of the weak signal enough to make it usable.

12. The front-end architecture for a receiver of claim 11, further comprising a baseband processor for jointly processing the degraded relatively strong signal and the improved weak signal to produce a very good quality signal.

13. In a receiver in a multi-antenna, multi-band radio, a method of front-end processing a received radio signal, wherein the signal is received through a first antenna that provides a strong signal from the radio signal and a second antenna that provides a weak signal from the radio signal, and is processed through corresponding first and second receive chains, wherein an improvement comprises:
 processing a signal in a first frequency band received by the first antenna in a first dedicated receive chain having band-dependent components optimized for processing signals in the first frequency band only, thereby producing a first processed signal of good quality;
 processing the signal in the first frequency band received by the second antenna in a second dedicated receive chain having band-dependent components optimized for processing signals in a second frequency band only, thereby producing a second processed signal of poorer quality than the first processed signal;
 processing the first and second processed signals in a set of band-independent components, which process signals equally well in the first and second frequency bands; and
 jointly processing the signals output from the band-independent components wherein the step of jointly processing the signals includes processing the signals utilizing interference rejection combining (IRC)-type processing.

\* \* \* \* \*